(12) United States Patent
Krishnamurthy et al.

(10) Patent No.: US 12,425,724 B2
(45) Date of Patent: Sep. 23, 2025

(54) METHOD AND SYSTEM FOR AUTO-DETECTION AND AUTO-CONNECTION BETWEEN A DEVICE AND AN ACCESSORY DEVICE

(71) Applicant: GoPro, Inc., San Mateo, CA (US)

(72) Inventors: Naveen Chinya Krishnamurthy, Fremont, CA (US); Ojas Gandhi, San Ramon, CA (US); Neal Nai-Chang Yu, San Mateo, CA (US); Rajesh Madhur, San Jose, CA (US); Otto Sievert, Oceanside, CA (US)

(73) Assignee: GoPro, Inc., San Mateo, CA (US)

( * ) Notice: Subject to any disclaimer, the term of this patent is extended or adjusted under 35 U.S.C. 154(b) by 106 days.

(21) Appl. No.: 17/678,370

(22) Filed: Feb. 23, 2022

(65) Prior Publication Data

US 2023/0057637 A1    Feb. 23, 2023

Related U.S. Application Data

(60) Provisional application No. 63/234,159, filed on Aug. 17, 2021.

(51) Int. Cl.
*H04N 23/66* (2023.01)
*H04N 7/10* (2006.01)
*H04N 23/661* (2023.01)
*H04W 4/80* (2018.01)
*H04N 5/77* (2006.01)
*H04W 84/18* (2009.01)

(52) U.S. Cl.
CPC ......... *H04N 23/661* (2023.01); *H04N 7/108* (2013.01); *H04W 4/80* (2018.02); *H04N 5/77* (2013.01); *H04W 84/18* (2013.01)

(58) Field of Classification Search
CPC ........ H04N 23/661; H04N 7/108; H04N 5/77; H04W 4/80; H04W 84/18
See application file for complete search history.

(56) References Cited

U.S. PATENT DOCUMENTS 10,944,893 B1    3/2021   Daulton
11,172,101 B1   11/2021   Boozer
(Continued)

OTHER PUBLICATIONS

International Search Report and Written Opinion issued in App. No. PCT/US22/40195, mailing date Nov. 3, 2022, 19 pages.

*Primary Examiner* — Lin Ye
*Assistant Examiner* — Fayez A Bhuiyan
(74) *Attorney, Agent, or Firm* — Young Basile Hanlon & MacFarlane, P.C.

(57) ABSTRACT

Methods and systems for auto-detecting and auto-connecting communication protocols with respect to an image capture device connected to an accessory device via an interface cable. A method for seamless connectivity including automatically detecting, by one of an image capture device and an accessory device, of a wired connection between the image capture device and the accessory device via an interface cable, automatically initiating, by the one of the image capture device and the accessory device, processing associated with a communication protocol supported by the image capture device and the accessory device, and automatically connecting the image capture device to the accessory device via the communication protocol when the processing is complete.

20 Claims, 7 Drawing Sheets

(56) References Cited

U.S. PATENT DOCUMENTS

| | | | |
|---|---|---|---|
| 2003/0081126 A1* | 5/2003 | Seaman | H04N 1/32112 |
| | | | 348/222.1 |
| 2008/0043110 A1 | 2/2008 | Aizawa | |
| 2012/0136969 A1* | 5/2012 | Li | H04L 1/1607 |
| | | | 709/219 |
| 2013/0072252 A1* | 3/2013 | Chen | H04M 1/72412 |
| | | | 455/550.1 |
| 2017/0034419 A1* | 2/2017 | Brockway, III | H04N 1/00127 |
| 2018/0131847 A1 | 5/2018 | Kokonaski | |

* cited by examiner

METHOD AND SYSTEM FOR AUTO-DETECTION AND AUTO-CONNECTION BETWEEN A DEVICE AND AN ACCESSORY DEVICE

CROSS REFERENCE TO RELATED APPLICATION

This application claims priority to U.S. Provisional Application Ser. No. 63/234,159, filed Aug. 17, 2021, which is incorporated herein by reference.

TECHNICAL FIELD

This disclosure relates to accessory devices and in particular, autodetection and auto-connection of a communication protocol between a device and an accessory device connected to the device via a wire.

BACKGROUND

Image capture devices can connect to a variety of devices including, but not limited to, mobile devices and desktop platforms, via a wire or cable such as a Universal Serial Bus (USB) cable. Users typically have to manually navigate the image capture device user interface to choose a communication protocol with which to connect to the accessory device. This is because there is not a standard USB communication protocol that can connect a multimedia capture device, such as the image capture device, to accessory devices. Different accessory devices require different communication protocols. Moreover, users also have to manually connect the image capture device to the accessory device when trying to establish a low power, wireless connection to the accessory device.

SUMMARY

Disclosed herein are implementations of methods and systems for auto-detecting and auto-connecting communication protocols with respect to a device connected via a wire to an accessory device.

In implementations, a method for seamless connectivity includes automatically detecting, by one of an image capture device and an accessory device, of a wired connection between the image capture device and the accessory device via an interface cable, automatically initiating, by the one of the image capture device and the accessory device, processing associated with a communication protocol supported by the image capture device and the accessory device, and automatically connecting the image capture device to the accessory device via the communication protocol when the processing is complete.

In implementations, the communication protocol is a connect communication protocol associated with the interface cable. In implementations, the communication protocol is a wireless communication protocol. In implementations, the wireless communication protocol is a low power, wireless communication protocol. In implementations, the image capture device includes multiple connect communication protocols and the accessory device includes image capture device applications configured to determine the communication protocol supported by the image capture device and the accessory device. In implementations, the method further includes automatically determining, by the image capture device, of a wireless communication protocol supported by the image capture device and the accessory device, automatically starting, by the image capture device, processing associated with the wireless communication protocol, automatically connecting the image capture device to the accessory device via the wireless communication protocol when the processing is complete. In implementations, the method further includes automatically executing, by the image capture device, the processing associated with the wireless communication protocol. In implementations, command and control instructions for the automatically detecting, the automatically initiating, the automatically determining, the automatically starting, first occurrence of the automatically connecting, and second occurrence of the automatically connecting are sent over an inter-integrated circuit of the interface cable. In implementations, the method further includes automatically determining whether the image capture device and the accessory device are functionally and operationally compatible and stopping communication protocol connection processing when the image capture device and the accessory device are incompatible.

In implementations, a method for seamless connectivity includes automatically detecting, by an image capture device, connection of an accessory device to the image capture device using an interface cable, automatically determining, by the image capture device, of a wireless communication protocol supported by the image capture device and the accessory device, automatically executing, by the image capture device, processing associated with the wireless communication protocol, and automatically connecting the image capture device to the accessory device via the wireless communication protocol when the processing is complete.

In implementations, the wireless communication protocol is a low power, wireless communication protocol. In implementations, the wireless communication protocol is Bluetooth Low-Energy. In implementations, the method further includes sending, by the image capture device, a request to the accessory device to enter a pairing mode, granting, by the image capture device, pairing with the accessory device, and establishing, by the image capture device, a Bluetooth Low-Energy connection with the accessory device. In implementations, the accessory device can send commands over the Bluetooth Low-Energy connection.

In implementations, an image capture device includes communication protocols and a processor. The processor configured to automatically detect an accessory device connected by an interface cable, automatically initiate processing associated with a communication protocol supported by the image capture device and the accessory device, the communication protocol one of the communication protocols, and automatically connect to the accessory device via the communication protocol when the processing is complete.

In implementations, the communication protocol is a connect communication protocol associated with the interface cable. In implementations, the communication protocol is a wireless communication protocol. In implementations, the wireless communication protocol is a low power, wireless communication protocol. In implementations, the processor is further configured to automatically determine a wireless communication protocol supported by the image capture device and the accessory device, the wireless communication protocol being one of the communication protocols, automatically start processing associated with the wireless communication protocol, and automatically connect to the accessory device via the wireless communication protocol when the processing is complete. In implementations, command and control instructions for automatic detection, automatically initiation, both occurrences of automatic connection, and automatic start are sent over an inter-integrated circuit of the interface cable

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Users connect image capture devices to a variety of accessory devices to enable hand-held use, hands-free use, or wearable use of the image capture device, powering of the image capture device, charging a battery of the image capture device, or combinations thereof.

Implementations of the image capture device enable automatic and seamless communication protocol connectivity of the accessory device to the image capture device after the image capture device and the accessory device are connected via a wire, a cable, a USB cable, a USB-C cable, or other interface cable (collectively "interface cable"), where the term interface cable includes, but is not limited to, associated controller circuits, authentication protocols, communication and control protocols, inter-integrated circuit (I2C) or serial communication protocols, power circuit and protocols, and charging circuit and protocols. In implementations, the image capture device uses an industry standard technology (the "USB composite device") with accompanying software applications running on each accessory device to provide seamless connectivity on iOS, Android, macOS, and Windows based accessory devices with no manual configuration by the user. For example, a USB composite device is a device that has more than one USB interface, each of which can be controlled independently. An example of this are multi-function printer/scanner/copier devices which have one USB interface for the printer and one USB interface for the scanner. For example, section 5.5 of the Universal Serial Bus Common Class Specification available from the USB Implementor's Forum provides a definition at https://www.usb.org/sites/default/files/usbccs10.pdf. That is, the image capture device may simultaneously support multiple connect communication protocols or multiple ethernet-over-USB protocols such as, but not limited to, media transfer protocol (MTP), remote network driver interface specification (RNDIS), Ethernet Control Model (ECM), or network control model (NCM) so the user does not have to switch protocols on the image capture device user interface every time they want to connect the image capture device to a different accessory device. In implementations, the accessory devices may include image capture device software applications which look for and connect to the image capture device over one of the multiple connect communication protocols. This provides users with a consistent experience across all accessory devices without the need to manually configure the image capture device for each accessory device.

In implementations, the image capture device may use a serial communication protocol connection of the interface cable to detect the connection to the accessary device, determine a wireless communication protocol supported by the accessary device, initiate the supported wireless communication protocol, and establish a supported wireless communication protocol connection. For example, the wireless communication protocol may be a low power, wireless connection such as, but not limited, to Bluetooth Low-Energy (BLE), Zigbee, Z-Wave, or 6LoWPAN.

The implementations of this disclosure are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

Figure 1A:
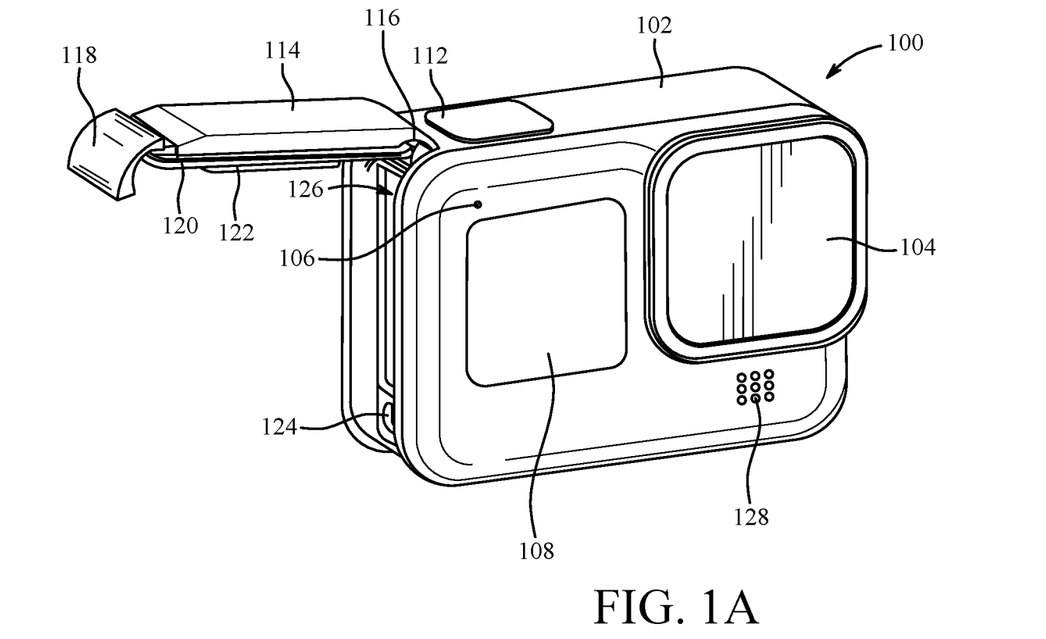
FIGS. 1A-B are isometric views of an example of an image capture device.
Figure 1B:
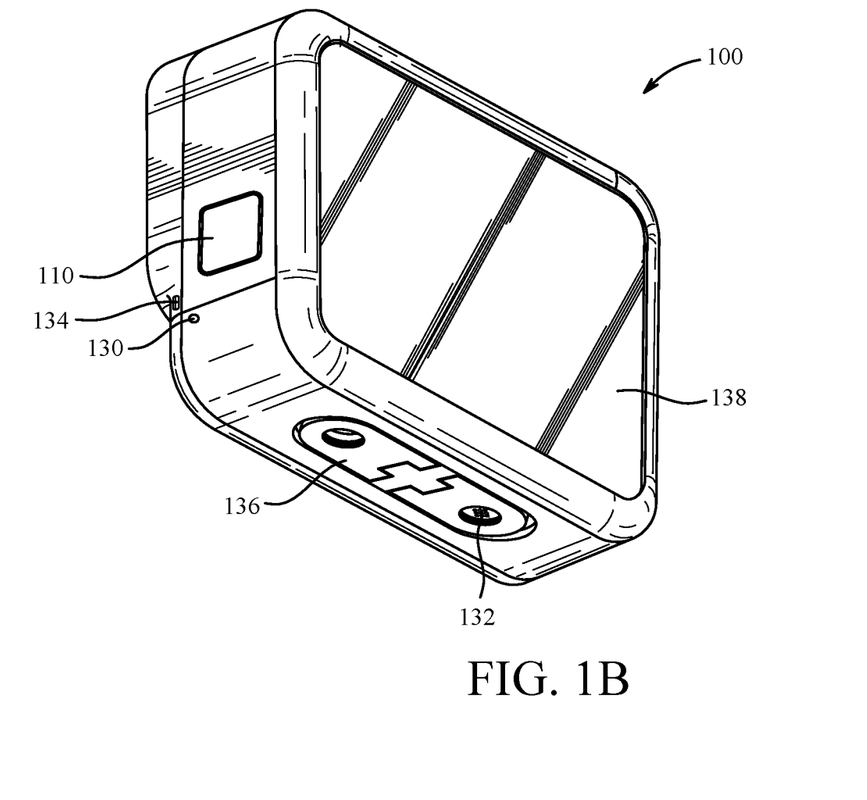

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 5:
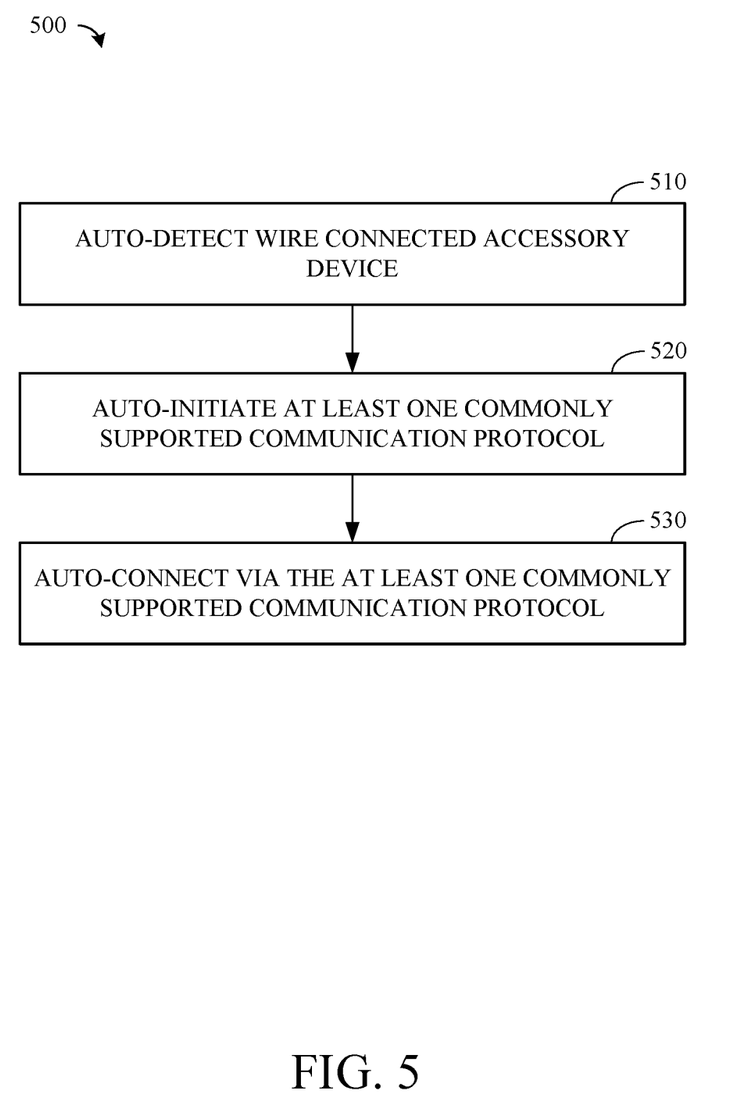
FIG. 5 is a flowchart of auto-detecting and auto-connecting a connection communication platform between a wire connected image capture device and an accessory device.
Figure 6:
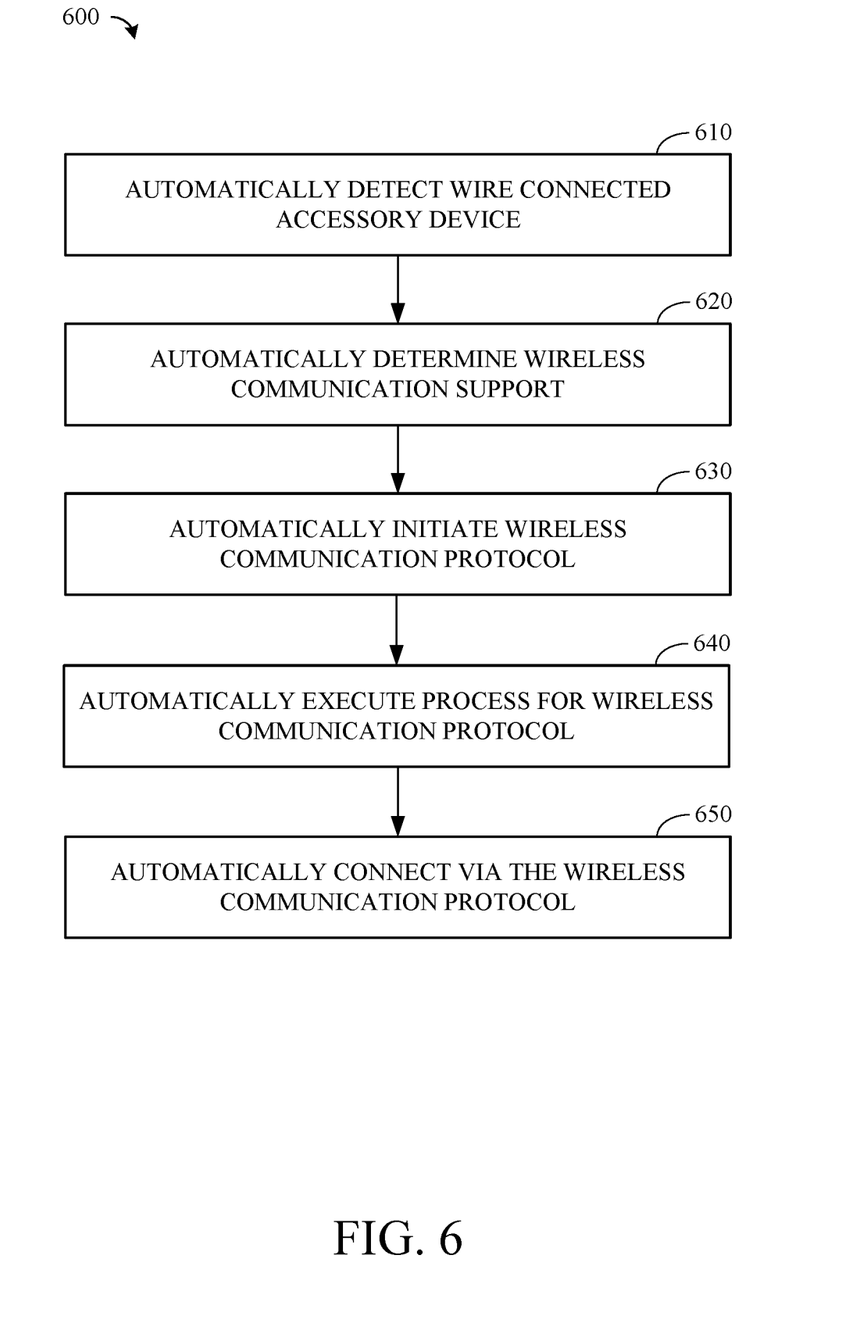
FIG. 6 is a flowchart of auto-detecting and auto-connecting a wireless communication platform between a wire connected image capture device and an accessory device.
Figure 7:
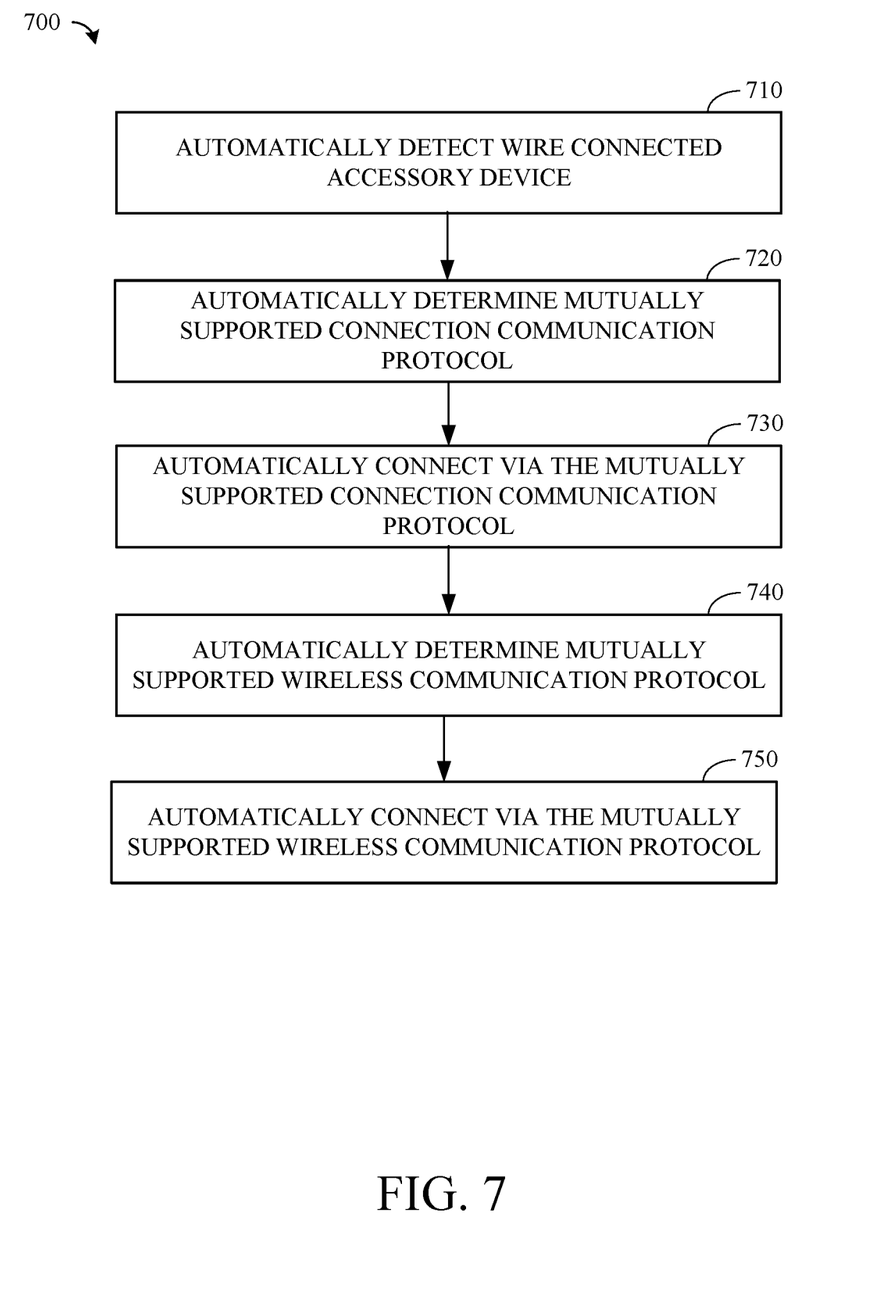
FIG. 7 is a flowchart of auto-detecting and auto-connecting communication platforms between a wire connected image capture device and an accessory device.

The image capture device 100 may be used to implement some or all of the techniques described in this disclosure, such as the technique 500 described in FIG. 5, the technique 600 described in FIG. 6, and the technique 700 described in FIG. 7.

Figure 2A:
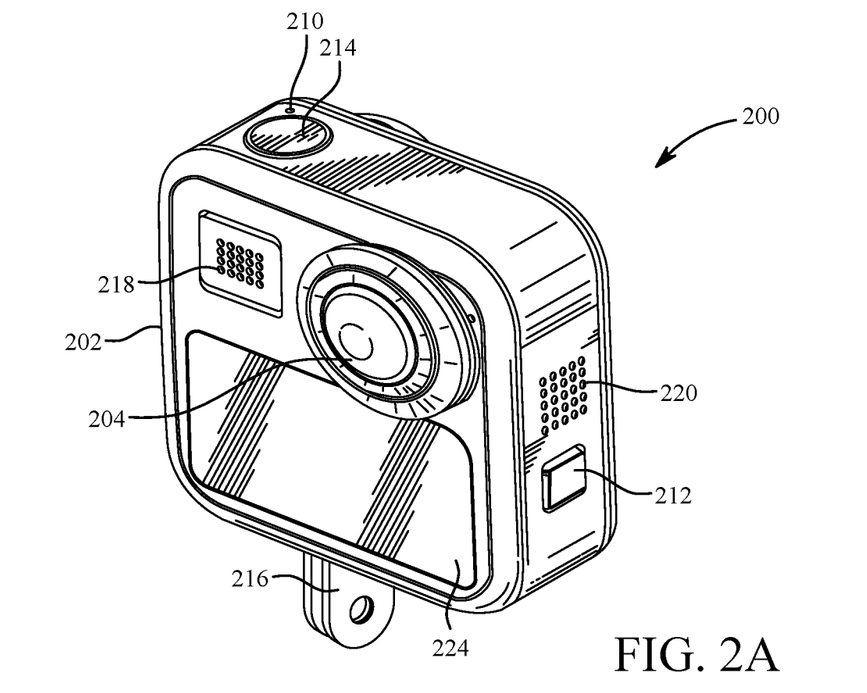
FIGS. 2A-B are isometric views of another example of an image capture device.
Figure 2B:
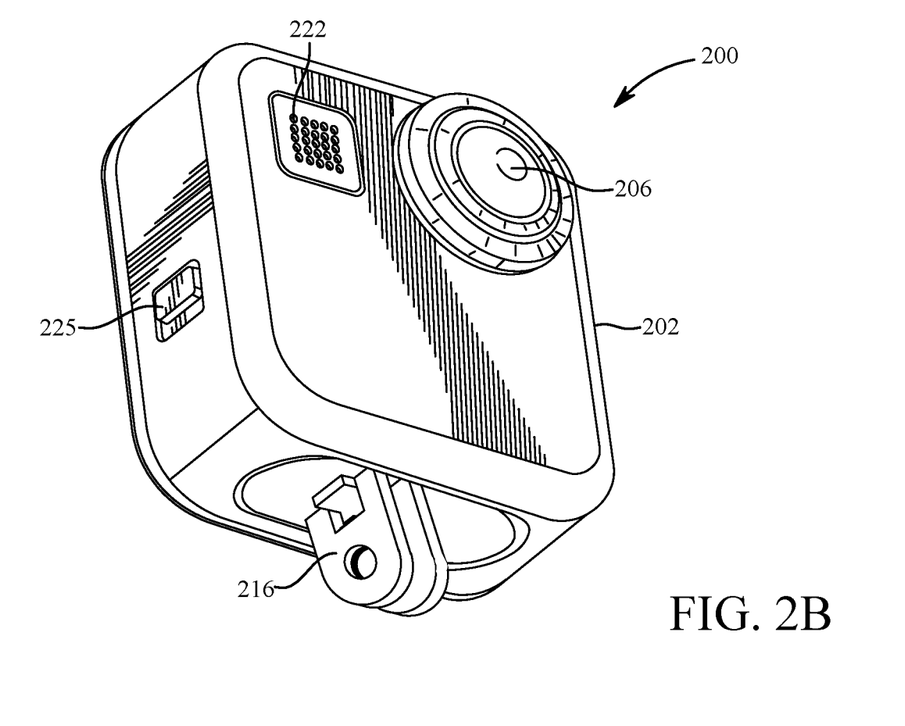

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

The image capture device 200 may be used to implement some or all of the techniques described in this disclosure, such as the technique 500 described in FIG. 5, the technique 600 described in FIG. 6, and the technique 700 described in FIG. 7.

Figure 3:
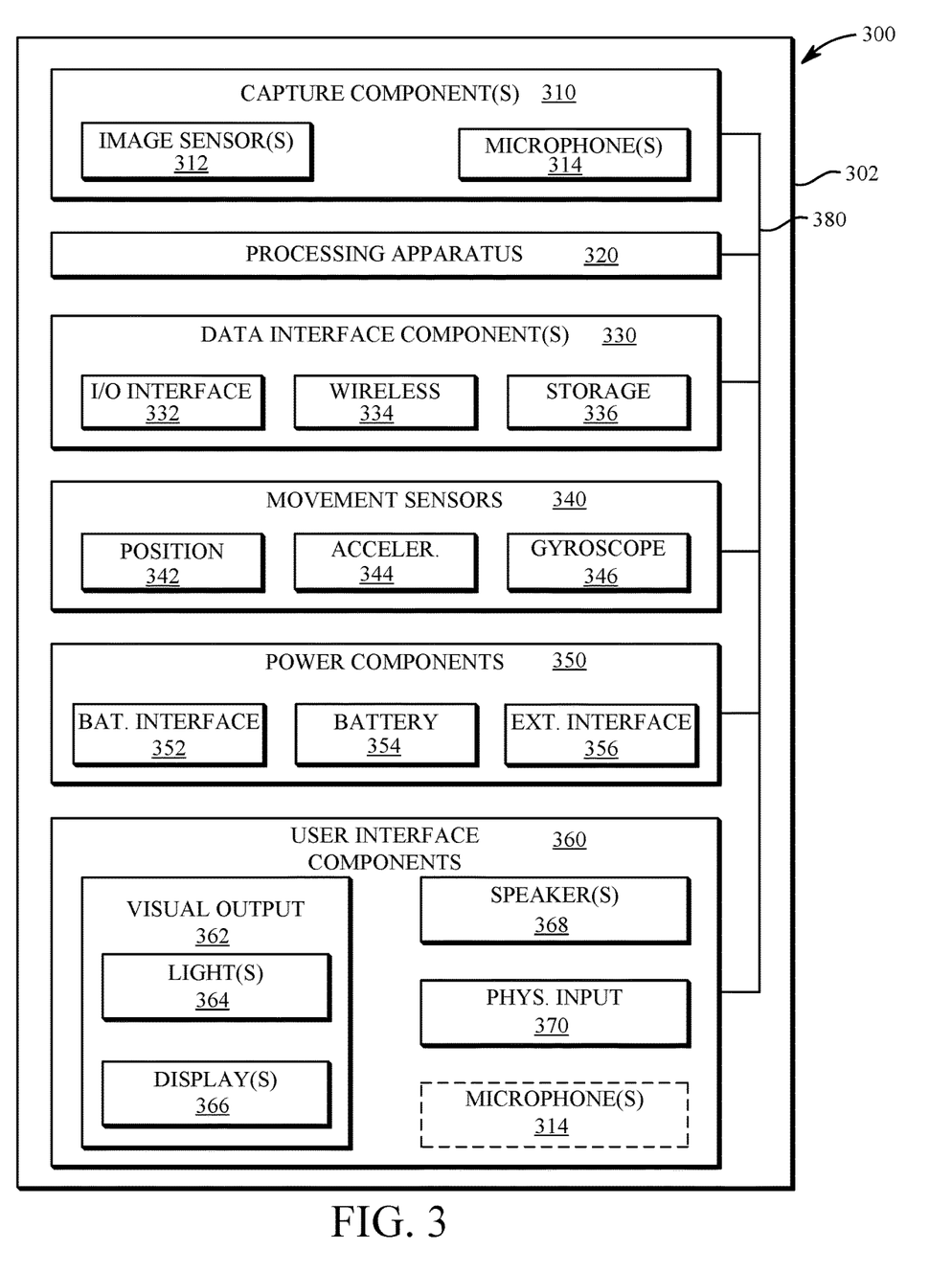
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the technique 500 described in FIG. 5, the technique 600 described in FIG. 6, and the technique 700 described in FIG. 7.

Figure 4:
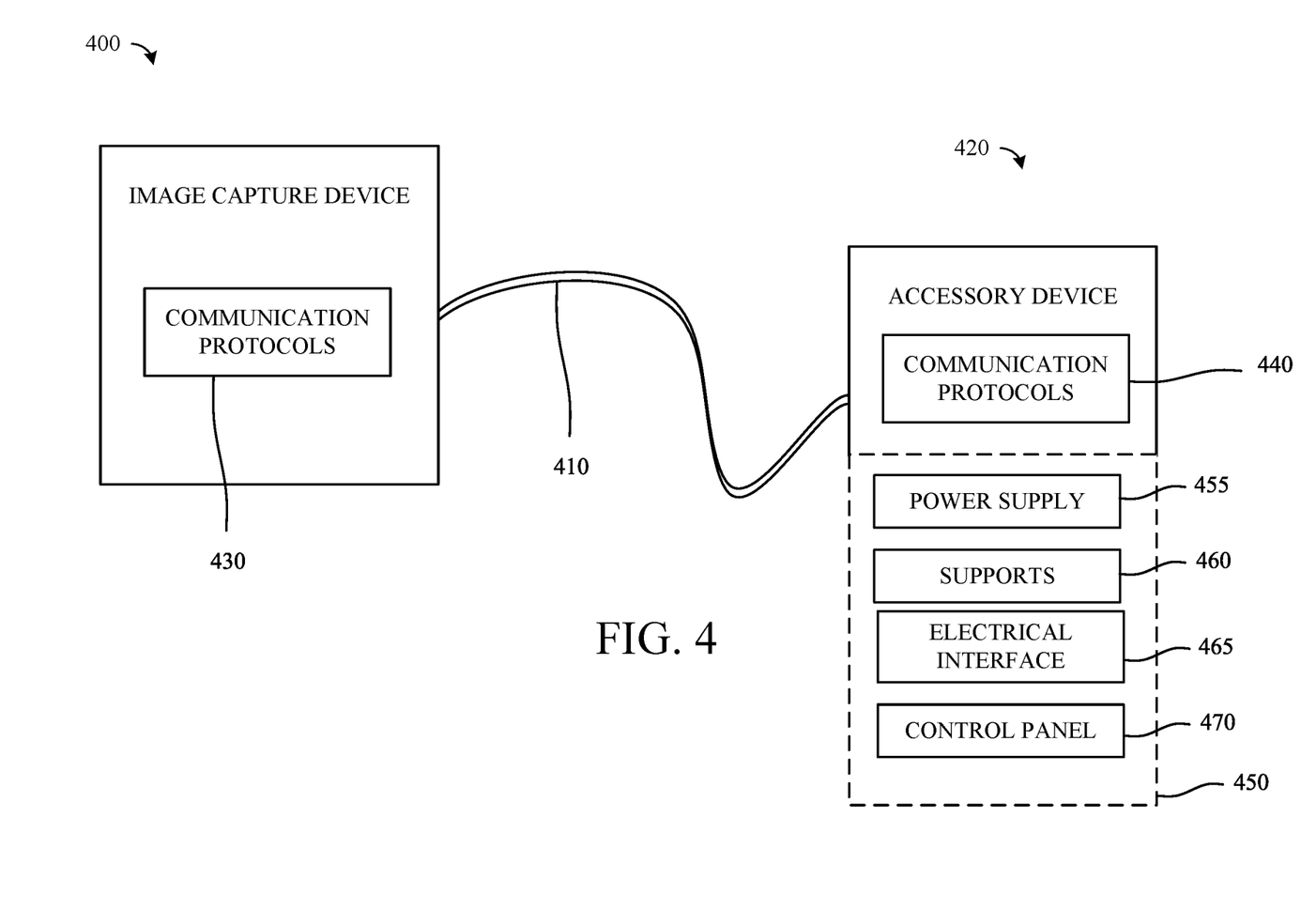
FIG. 4 is a block diagram of an image capture device and an accessory device.

FIG. 4 is a block diagram of an image capture device 400 connected via an interface cable 410 to an accessory device 420. The image capture device 400 may be implemented by or incorporate the image capture device 100 of FIG. 1A-B, the image capture device 200 of FIG. 2A-B, or the image capture device 300 of FIG. 3. The image capture device 400 may include communication protocols 430 including, but not limited to, ethernet-over-USB protocols such as, but not limited to, media transfer protocol (MTP), remote network driver interface specification (RNDIS), Ethernet Control Model (ECM), or network control model (NCM) (collectively "connect communication protocols") and wireless communication protocol such as low power, wireless connection protocols including, but not limited, to Bluetooth Low-Energy (BLE), Zigbee, Z-Wave, or 6LoWPAN (collectively "wireless communication protocols").

The accessory device 420 may include communication protocols 440 which may be the connect communication protocols and the wireless communication protocols. The accessory device 420 may be configured for both wired and wireless connection to the image capture device 400. The wireless communication between the accessory device 420 and the image capture device 400 may be present independent of a physical connection between the image capture device 400 and the accessory device 420 via the interface cable 410, for example. Wireless communication between the image capture device 400 and the accessory device 420 allows for a more robust user experience by enabling hands-free operation of the image capture device 400 and when the image capture device 400 is concealed within a water/weather-proof housing that interferes with connection of the interface cable 410.

The accessory device 420 may be mobile devices and desktop devices. In implementations, the accessory device 420 may be a body 450 with an integrated power supply 455 (e.g., a battery) and a variety of supports 460 that allow for connection of the image capture device 400 to the accessory device 420 for utilization across a variety of use cases. For example, the supports 460 may include a first (upper) support with protrusions (e.g., fingers) that are configured for connection to a corresponding structure on the image capture device 400; a second (intermediate) support that is pivotably reconfigurable between a stowed configuration and a deployed configuration to facilitate connection of the accessory device 420 and the image capture device 400 to a corresponding mounting structure on an ancillary product (accessory); and a third (lower) support that is reconfigurable between a collapsed (closed) configuration, in which the accessory device 420 acts as (provides) a grip for the image capture, and an expanded (open) configuration, in which the accessory acts as (provides) a freestanding base (e.g., a stand, tripod) for the image capture device 400. The accessory device 420 may include an electrical interface 465 and a control panel 470 (e.g., a user interface), where the electrical interface 465 may be configured to receive the interface cable 410, to facilitate various command and control operations, bi-directional electrical communication, charging of the image capture device 400 by the power supply 455, and wired control over functionality of the image capture device 400 via the control panel 470.

The interface cable 410 can be, for example, a wire, a cable, a USB cable, or a USB-C cable which includes circuits and protocols for authentication, command and control, status, power, charging, and other functionality.

Operationally, a user connects the image capture device 400 to the accessory device 420 via the interface cable 410. In implementations, the image capture device 400 may detect the accessory device 420, determine a connect communication protocol which is supported by the image capture device 400 and the accessory device 420, initiate the connect communication protocol, and establish a connection via the connect communication protocol. This is performed without further input, assistance, or action from the user. That is, the connection process is automatically performed once the image capture device 400 is connected to the accessory device 420. In implementations, the accessory device 420 may automatically perform the connection process. In implementations, the accessory device 420 and the image capture device 400 may collectively perform the connection process. The connection process may include authentication and other security related processing as is understood.

In implementations, the image capture device 400 may determine whether the accessory device 420 is compatible with and supported by the image capture device 400. That is, the image capture device 400 may determine functional and operational compatibility as between the image capture device 400 and the accessory device 420.

In implementations, the image capture device 400 may determine a wireless communication protocol which is supported by the image capture device 400 and the accessory device 420, initiate the wireless communication protocol, and establish a wireless connection via the wireless communication protocol. Command and control instructions may be sent using, for example, over a I2C component of a USB-C interface. Commands and control instructions related to the wireless communication protocol may be automatically sent over the interface cable, for example, over the I2C component of a USB-C interface. Command and control instructions, status, and other information may be sent by either the image capture device 400 or the accessory device 420 via the established wireless connection irrespective of whether the image capture device 400 and the accessory device 420 remain connected by the interface cable 410. That is, the interface cable 410 may then be used for other services or connections. The wireless connection process is performed without further input, assistance, or action from the user. In an example, the wireless communication protocol may be BLE. In this instance, the image capture device 400 may initiate the BLE protocol, send a request to the accessory device 420 to enter BLE pairing mode, grant BLE pairing with the accessory device 420, and establish the BLE connection.

FIG. 5 is a flowchart of an example technique 500 for automatically detecting and establishing communication protocol connections between an image capture device and an accessory device connected via an interface cable to the image capture device. The technique 500 includes: auto-detecting 510 a wired connection between an image capture device and an accessory device; auto-initiating 520 at least one commonly supported communication protocol; and auto-connecting 530 via the at least one commonly supported communication protocol. For example, the technique 500 may be implemented by the image capture device 100 shown in FIGS. 1A-1B, the image capture device 200 shown in FIGS. 2A-2B, the image capture device 300 shown in FIG. 3, or the image capture device 400 of FIG. 4.

The technique 500 includes auto-detecting 510 a wired connection between an image capture device and an accessory device. A user uses an interface cable to connect an image capture device to an accessory device. One or a combination of the image capture device and the accessory device auto-detect the interface cable connection (wired connection) and determine a communication protocol that is supported by both the image capture device and the accessory device. In implementations, the accessory device includes an image capture device application configured to determine a communication protocol that is supported by both the image capture device and the accessory device. Command and control information and instructions used for detection and determination of the communication protocol can be sent over a serial communication protocol such as I2C. No user interaction is needed after the image capture device is connected to the accessory device via the interface cable to start and complete the connection processing. Processing can be stopped if no communication protocol is available that is supported by both the image capture device and the accessory device. An alert may be provided to notify the user. In implementations, one or a combination of the image capture device and the accessory device can determine if the image capture device and the accessory device are functionally or operationally compatible. Processing can be stopped and an alert provided if the image capture device and the accessory device are not compatible.

The technique 500 includes auto-initiating 520 at least one commonly supported communication protocol. One or a combination of the image capture device and the accessory device auto-initiate the processing associated with the at least one commonly supported communication protocol. That is, the requirements for establishing a connection using the at least one commonly supported communication protocol are executed or performed automatically as between the image capture device and the accessory device.

The technique 500 includes auto-connecting 530 via the at least one commonly supported communication protocol. The image capture device and the accessory device are automatically connected once the requirements for establishing the connection using the at least one commonly supported communication protocol are completed. In implementations, other communication protocols can be automatically initiated to establish other connection types, such as, for example, wireless connections and low power, wireless connections.

FIG. 6 is a flowchart of an example technique 600 for automatically detecting and establishing wireless communication protocol connections between an image capture device and an accessory device connected via an interface cable to the image capture device. The technique 600 includes: automatically detecting 610 a wired connection between an image capture device and an accessory device; automatically determining 620 a supported wireless communication protocol; automatically initiating 630 the wireless communication protocol; automatically executing 640 processing for the wireless communication protocol; and automatically connecting 650 via the wireless communication protocol. For example, the technique 600 may be implemented by the image capture device 100 shown in FIGS. 1A-1B, the image capture device 200 shown in FIGS. 2A-2B, the image capture device 300 shown in FIG. 3, or the image capture device 400 of FIG. 4.

The technique 600 includes automatically detecting 610 a wired connection between an image capture device and an accessory device. A user uses an interface cable to connect an image capture device to an accessory device. In implementations, the image capture device automatically detects the interface cable connection (wired connection). Command and control information and instructions used for detection can be sent over a serial communication protocol such as I2C. No user interaction is needed after the image capture device is connected to the accessory device via the interface cable to start and complete the connection processing.

The technique 600 includes automatically determining 620 a supported wireless communication protocol. In implementations, the image capture device automatically determines whether the accessory device supports a wireless communication protocol that is supported by both the image capture device and the accessory device. Processing can be stopped if no wireless communication protocol is available that is supported by both the image capture device and the accessory device. An alert may be provided to notify the user. In implementations, the image capture device can determine if the image capture device and the accessory device are functionally or operationally compatible. Processing can be stopped and an alert provided if the image capture device and the accessory device are not compatible.

The technique 600 includes automatically initiating 630 the wireless communication protocol. The image capture device automatically initiates the processing associated with the wireless communication protocol.

The technique 600 includes automatically executing 640 processing for the wireless communication protocol. The image capture device automatically executes the requirements for establishing a connection between the image capture device and the accessory device using the wireless communication protocol.

The technique 600 includes automatically connecting 650 via the wireless communication protocol. The image capture device and the accessory device are automatically connected once the requirements for establishing the wireless connection are completed. In implementations, the interface cable can be disconnected and be used for other services and devices.

FIG. 7 is a flowchart of an example technique 700 for automatically detecting and establishing communication protocol connections between an image capture device and an accessory device connected via an interface cable to the image capture device. The technique 700 includes: automatically detecting 710 a wired connection between an image capture device and an accessory device; automatically determining 720 mutually supported connect communication protocol; automatically connecting 730 via the connect communication protocol; automatically determining 740 mutually supported wireless communication protocol; and automatically connecting 750 via the wireless communication protocol. For example, the technique 700 may be implemented by the image capture device 100 shown in FIGS. 1A-1B, the image capture device 200 shown in FIGS.

2A-2B, the image capture device 300 shown in FIG. 3, or the image capture device 400 of FIG. 4.

The technique 700 includes automatically detecting 710 a wired connection between an image capture device and an accessory device. A user uses an interface cable to connect an image capture device to an accessory device. One or a combination of the image capture device and the accessory device automatically detect the interface cable connection (wired connection). Command and control information and instructions used for detection can be sent over a serial communication protocol such as I2C. No user interaction is needed after the image capture device is connected to the accessory device via the interface cable to start and complete the connection processing.

The technique 700 includes automatically determining 720 mutually supported connect communication protocol. The one or a combination of the image capture device and the accessory device automatically determines a mutually supported connect communication protocol. Processing can be stopped if no connect communication protocol is available that is supported by both the image capture device and the accessory device. An alert may be provided to notify the user. In implementations, one or a combination of the image capture device and the accessory device can determine if the image capture device and the accessory device are functionally or operationally compatible. Processing can be stopped and an alert provided if the image capture device and the accessory device are not compatible.

The technique 700 includes automatically connecting 730 via the connect communication protocol. One or a combination of the image capture device and the accessory device automatically initiate the processing associated with the connect communication protocol. That is, the requirements for establishing a connection using the connect communication protocol are executed or performed automatically as between the image capture device and the accessory device. The image capture device and the accessory device are automatically connected once the requirements for establishing the connection using the connect communication protocol are completed.

The technique 700 includes automatically determining 740 mutually supported wireless communication protocol. In implementations, the image capture device automatically determines whether the accessory device supports a wireless communication protocol that is supported by both the image capture device and the accessory device. Processing can be stopped if no wireless communication protocol is available that is supported by both the image capture device and the accessory device. An alert may be provided to notify the user. The image capture device automatically initiates the processing associated with the wireless communication protocol. The image capture device automatically executes the requirements for establishing a connection between the image capture device and the accessory device using the wireless communication protocol.

The technique 700 includes automatically connecting 750 via the wireless communication protocol. The image capture device and the accessory device are automatically connected once the requirements for establishing the wireless connection are completed. In implementations, the interface cable can be disconnected and be used for other services and devices.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for seamless connectivity, the method comprising:
   automatically detecting, by one of an image capture device and an accessory device, a wired connection between the image capture device and the accessory device via an interface cable;
   in response to detection of the wired connection, automatically initiating, by the one of the image capture device and the accessory device, connection processing associated with a wireless communication protocol stored in the image capture device and the accessory device; and
   automatically connecting the image capture device to the accessory device via the wireless communication protocol when the connection processing initiated in response to detection of the wired connection is complete.

2. The method of claim 1, wherein a connect communication protocol is associated with the interface cable.

3. The method of claim 1, wherein the wireless communication protocol is a Bluetooth Low-Energy wireless communication protocol.

4. The method of claim 1, wherein the wireless communication protocol is a low power, wireless communication protocol.

5. The method of claim 1, wherein the image capture device includes multiple connect communication protocols and the accessory device includes image capture device applications configured to determine the wireless communication protocol supported by the image capture device and the accessory device.

6. The method of claim 1, further comprising:
   automatically determining, by the image capture device, the wireless communication protocol supported by the image capture device and the accessory device.

7. The method of claim 6, further comprising:
   automatically executing, by the image capture device, the connection processing associated with the wireless communication protocol.

8. The method of claim 6, wherein command and control instructions for the automatically detecting, the automatically initiating, the automatically determining, and the automatically connecting are sent over an inter-integrated circuit of the interface cable.

9. The method of claim 6, further comprising:
   automatically determining whether the image capture device and the accessory device are functionally and operationally compatible; and
   stopping communication protocol connection processing when the image capture device and the accessory device are incompatible.

10. A method for seamless connectivity, the method comprising:
    automatically detecting, by an image capture device, connection of an accessory device to the image capture device using an interface cable;
    automatically determining, by the image capture device, a wireless communication protocol stored in the image capture device and the accessory device when detecting the connection using the interface cable;

automatically executing, by the image capture device, connection processing associated with the wireless communication protocol; and automatically connecting the image capture device to the accessory device via the wireless communication protocol when the connection processing initiated in response to detection of the connection via the interface cable is complete.

11. The method of claim 10, wherein the wireless communication protocol is a low power, wireless communication protocol.

12. The method of claim 11, wherein the wireless communication protocol is Bluetooth Low-Energy.

13. The method of claim 12, the method further comprising:

sending, by the image capture device, a request to the accessory device to enter a pairing mode;

granting, by the image capture device, pairing with the accessory device; and establishing, by the image capture device, a Bluetooth Low-Energy connection with the accessory device.

14. The method of claim 13, wherein the accessory device can send commands to the image capture device over the Bluetooth Low-Energy connection.

15. An image capture device, comprising:

wireless communication protocols; and a processor configured to:

automatically detect an accessory device connected by an interface cable;

automatically initiate connection processing associated with one of the wireless communication protocols stored in both the image capture device and the accessory device when the accessory device is connected to the image capture device by the interface cable; and automatically connect to the accessory device via the one of the wireless communication protocols when the connection processing initiated in response to detection of the connection via the interface cable is complete.

16. The image capture device of claim 15, wherein a connect communication protocol is associated with the interface cable.

17. The image capture device of claim 15, wherein the wireless communication protocol is a Bluetooth Low-Energy wireless communication protocol.

18. The image capture device of claim 15, wherein the wireless communication protocol is a low power, wireless communication protocol.

19. The image capture device of claim 15, the processor is further configured to:

automatically determine a wireless communication protocol supported by the image capture device and the accessory device, the wireless communication protocol being one of the communication protocols.

20. The image capture device of claim 19, wherein command and control instructions for automatic detection, automatic initiation, and automatic connection are sent over an inter-integrated circuit of the interface cable.

* * * * *